United States Patent [19]

Lavallee

[11] Patent Number: 4,876,316
[45] Date of Patent: Oct. 24, 1989

[54] HIGH TEMPERATURE MAGNET WIRE BOND COAT POLYAMIDE/ALDEHYDE/AROMATIC ALCOHOL REACTION PRODUCT

[75] Inventor: Francois A. Lavallee, Fort Wayne, Ind.

[73] Assignee: Essex Group, Inc., Fort Wayne, Ind.

[21] Appl. No.: 173,336

[22] Filed: Mar. 24, 1988

Related U.S. Application Data

[62] Division of Ser. No. 78,441, Jul. 27, 1987, abandoned.

[51] Int. Cl.$^4$ .............................................. C08G 69/50
[52] U.S. Cl. ................................ 525/427; 174/110 N; 174/120 SR; 428/375; 428/379; 428/383; 428/474.4; 528/310; 528/323
[58] Field of Search ........................ 525/427; 528/323

[56] References Cited

U.S. PATENT DOCUMENTS

| | | | |
|---|---|---|---|
| 2,430,860 | 11/1947 | Cairns | 260/72 |
| 2,430,950 | 11/1947 | Rothrock | 260/6 |
| 2,443,450 | 6/1948 | Graham et al. | 117/161 |
| 3,647,757 | 3/1972 | Lee | 260/72.5 |
| 4,216,263 | 8/1980 | Otis et al. | 428/383 |
| 4,400,430 | 8/1983 | Miyake et al. | 428/383 |
| 4,420,535 | 12/1983 | Walrath et al. | 428/379 |
| 4,420,536 | 12/1983 | Saunders et al. | 428/383 |
| 4,505,978 | 3/1985 | Smith | 428/379 |

FOREIGN PATENT DOCUMENTS 573482 11/1945 United Kingdom ................ 525/247

Primary Examiner—Harold D. Anderson
Attorney, Agent, or Firm—Allegretti & Witcoff, Ltd.

[57] ABSTRACT

The present invention is for a 180° C. class heat activated magnet wire bondcoat comprising the invention product of (a)

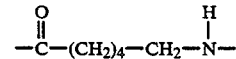

(b) R—CHO wherein R is an aliphatic moiety
(c) R'—OH wherein R' is an aromatic moiety and the resulting composition has repeating units of the formula

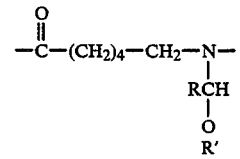

Additionally disclosed are methods for making said bondcoat and magnet wire coated with said bondcoat.

11 Claims, 1 Drawing Sheet

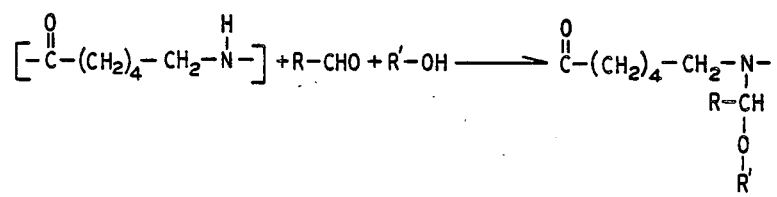

HIGH TEMPERATURE MAGNET WIRE BOND COAT POLYAMIDE/ALDEHYDE/AROMATIC ALCOHOL REACTION PRODUCT

This is a division of application Ser. No. 78,441 filed on July 27, 1987 now abandoned.

DESCRIPTION

1. Technical Field

The technical field to which this invention applies is wire coatings, in particular magnet wire coatings and most particularly to heat bondable, magnet wire coatings.

2. Background Art

During the past quarter century, bondable magnet wire has been used in a wide variety of applications. These include transformers, lift magnets, solenoids, bobbinless coils, clutch coils, television yoke coils as well as stator or rotor field coils.

The use of the bondable magnet wire affords a simple, efficient way to cement or bond the individual coils of magnet wire to one another, thereby reducing the likelihood of the coil unraveling during handling or processing.

Typically, the bondable wire comprises a standard magnet wire having one or more conventional electrically insulating layers which are overcoated with a bondable exterior layer. These bondable layers may be activated in a number of ways. The most common techniques are to apply a solvent to cause the bondable layer to dissolve or become tacky, then wind the tacky wire into a coil, driving off the solvent and thereby bonding the coils together. An alternate method would be to wind the coil using the magnet wire having a solvent bondable coat and then dipping the coil into or spraying the coil with a solvent thereby again causing the bondable layer to become tacky and bond the individual windings together. A second approach would be to prepare a coil having a thermoplastic bondcoat which would soften or melt at an acceptably low temperature so that when the coil was exposed to heat (either in an oven or through electrical resistance heating) the bond layer would flow and bond the individual windings together upon cooling.

There are a number of problems associated with each of these approaches. The solvent bonding technique may result in solvent residue being trapped between the coils, or creating bubbles in the bond coat, both of which could cause problems with the resultant coil performance. Additionally, solvents are often very expensive, environmentally unacceptable, may be hazardous to workers' health and require the added step of drying to remove the solvent after bonding has taken place. However, these methods are easy to use and therefore, have been the traditional methods employed to manufacture such wire.

The heat bondable, thermoplastic coatings, do not require the added expense or undesirable side effects of using the solvent to cause the windings to bond to one another, however, most bondcoats of this type to date have not been able to achieve the high bond strength at elevated operating temperatures such as that required to acheive the 180° C. Class coils at acceptable cost.

Presently, 180° C. Class bondcoats are achieved generally using solvent bondable materials such as epoxies. In view of the expense, hazard and undesirability of the solvent bond coat approach, what is needed in this art is a heat bondable bond coat capable of operating in 180° C. Class environments.

3. Disclosure of Invention

The present invention comprises a heat bondable, magnet wire bond coat comprising the reaction product of (1)

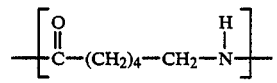

(2) R—CHO wherein R is an aliphatic moiety
(3) R'—OH wherein R' is an aromatic moiety, and
the resulting bondcoat has repeating units of the formula

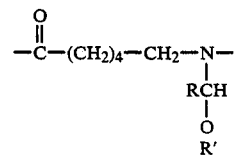

The present invention also comprises a method for manufacturing said bondcoat and a magnet wire comprising a layer of one or more electrically insulating materials and a bondcoat of the present invention.

Other features and advantages of the present invention will become more apparent from the specification and claims and from the accompanying drawings which illustrate an embodiment of the invention.

BRIEF DESCRIPTION OF DRAWINGS

The FIGURE discloses the reaction constituents and resulting product of the present invention.

BEST MODE FOR CARRYING OUT THE INVENTION

As may be seen from the FIGURE, one of the primary constituents of the formulation for preparing the bondcoat is a linear, polyamide structure. Although not every polyamide material will result in an acceptable bondcoat being produced by this reaction (some will be too brittle or have other physical deficiencies which may make the resulting bondcoat less than an optimum candidate) polyamides such as Nylon 6 or modified Nylon 6, or possibly Nylon 11 or Nylon 12 are excellent candidates. The preferred material and the polyamide of choice is Nylon 6.

The selected polyamide should have a melt temperature of about 200° C. and preferably between 210° C. and about 250° C. to produce a bondcoat having physical properties consistent with 180 Class standards.

The second constituent is an aliphatic aldehyde having the formula R-CHO where the R is any aliphatic group. However, the preferred aliphatic aldehyde should have a low molecular weight and will be soluble in the solvent mixture and is preferred to have less than seven carbons. A few typical aldehydes which may be used are butyraldehyde, propanol, acetaldehyde and paraformaldehyde with paraformaldehyde being the preferred material. The aldehyde could also be a mixture of one or more of the above-referenced aldehydes.

The third necessary constituent is an aromatic alcohol having a formula R'—(OH)$_x$ where R' represents an aromatic moiety. Typically, compounds useful in the preparation are cresylic acid, phenol, methylated phenol, alkylated phenol, meta, para-cresol. As may be seen, these aromatic components may be substituted with a number of substituents so long as it does not impair its solubility or reactivity with the solvents or other constituents used in the reaction or result in certain unacceptable physical properties of the resulting bondcoat. The preferred material is either phenol or cresylic acid due to its ready availability and inexpensive cost. Again, this constituent could be a mixture of any one or more of the different aromatic alcohols and in fact, the preferred constituent is a mixture comprising phenol and cresylic acid.

The aldehyde and alcohol constituents should be present in at least a one-to-one stoichiometric relationship with the amount of nitrogen present in the polyamide and in fact the aromatic alcohol is typically present in greater than one-to-one relationship as it is often used as the solvent carrier during the preparation of the bondcoat and in the cutting mixture in preparing the bondcoat for application onto the wire.

The preparation of the bondcoat using these constituents is typically performed in a solvent mixture compatible with all constituents and particularly useful in dissolving the polyamide. These constituents are well known and, as stated above, often comprise phenol or cresylic acid or a mixture thereof. The preferred solution is a mixture of phenol and cresylic acid and most preferred is a mixture of these two components in a weight percent of about 70 percent phenol to about 30 percent cresylic acid.

The constituents are mixed together in a common solvent and then heated to effect the reaction. There is no particular order of addition for the individual constituents, however, typically the polyamide is dissolved in the solvent mixture and then the other reactants are mixed in to form the solution. The mixture is then stirred until homogenous and heated to temperatures high enough to affect the reaction. Typically, this temperature will be the same as, or lower than, the boiling temperature of the aliphatic aldehyde. The reason for limiting the temperature is that the aldehyde, should it evaporate, results in a less than consistent product due the loss in stoichiometry. Typically, these temperatures will be about 100° C. to about 160° C. and for the preferred material, which is paraformaldehyde, the reaction temperatures will be between 110° C. to about 130° C. The mixture is continually stirred and heated until the viscosity and the solids content remain constant signifying completion of the reaction.

Once the reaction is completed, the bondcoat is prepared for application onto the wire by adjusting the viscosity and solids content using a compatible solvent mixture (one which is compatible with the bondcoat solution and the enamel which is present on the wire to be coated). This is usually the conventional enamel solvent of hydrocarbon 100, cresylic acid and phenol which is a conventional enamel solvent in the industry. Typically the solids content of the resulting solution will be about 10 percent to about 50 percent by weight, however, the individual solids content desired and resulting viscosity will be a function of the method of application used to apply the bondcoat to the wire.

The bondcoat may now be applied in any of the conventional, magnet wire processes which are known to one skilled in the art. One typical method is to draw a wire having one or more layers of electrical insulation to be coated, through a reservoir of bondcoat solution thereby coating the wire with a layer of the bondcoat. The coated wire is then drawn through a die having a precise opening which will permit only a desired thickness of bondcoat to remain on the wire surface after it has passed through the die. The coated wire is then passed through an oven and the bondcoat is dried by the removal of the solvent and cured at a chosen temperature. The process may be repeated several times in order to build the proper bondcoat thickness onto the wire.

EXAMPLE

A polyamide bondcoat of the present invention was prepared as follows:

A mixture of the following components in the following proportions was prepared in a flask.

TABLE I

| Component | Total per 100 grams of enamel |
| --- | --- |
| Nylon 6 | 18.03 |
| Paraformaldehyde | 0.99 |
| Phenol | 50.87 |
| Cresylic Acid | 17.45 |
| 100 Hydrocarbon | 12.66 |

The mixture was stirred while slowly being heated to between about 110° C. to about 130° C. The solution continued to be stirred and maintained at temperature until the viscosity and solids of the reaction mixture remained constant. The resulting bondcoat had a solids content of 24.8 percent by weight having been reacted for four hours. The enamel, solids and viscosity were adjusted through the addition of a cutting solution of 97 percent 100 Hydrocarbon and 3 percent phenol/cresylic acid mixture (70:30) until the solids content was 20.7 percent by weight and the viscosity at 30° C. was 7400 cps. The bondcoat was subsequently applied (using conventional wire enameling apparatus to a thickness of 1.0 mil) to a 0.0403 mil diameter wire (AWG 18) which had 2.0 mils of a polyester base coat applied to it.

The subsequent bondcoat did not soften at 150° C., passed the 200° C. heat shock and the dry mandrel pull tests (standard of the industry) and did not craze when lubricated. Additionally, its bond strengths at different temperatures were measured and the results are listed in Table II below.

TABLE II

| Temperature | Bond Strength Lb |
| --- | --- |
| RT (75° F.) | 44 |
| 100° C. | 21.8 |
| 150° C. | 16.3 |
| 180° C. | 7.5 |

TABLE III

| Bondcoat Composition | Bond Strength @ T° | | | | | | |
| --- | --- | --- | --- | --- | --- | --- | --- |
|  | R.T.(75° F.) | 100° C. | 130° C. | 150° C. | 180° C. | 210° C. | 220° C. |
| Aliphatic/aromatic thermoplastic nylon | 32.0 | 18.9 | 17.2 | 11.1 | 2.8 | — | — |
| Epoxy | 46.0 | 12.3 | 4.0 | 1.5 | — | — | — |

TABLE III-continued

| Bondcoat Composition | Bond Strength @ T° | | | | | | |
|---|---|---|---|---|---|---|---|
| | R.T.(75° F.) | 100° C. | 130° C. | 150° C. | 180° C. | 210° C. | 220° C. |
| P. D. George Epoxy | 50.0 | 12.3 | 2.6 | 1.2 | — | — | — |
| Nylon (McGregor) | 24.4 | 16.9 | 11.3 | 7.1 | 2.3 | — | — |
| Polyester (P. D. George) | 41.5 | 5.3 | 1.5 | 0.8 | — | — | — |
| Bondcoats Polyamide | 40.3 | 5.3 | 2.1 | 0.9 | — | — | — |
| Example | 44.0 | 21.8 | — | 16.3 | 7.5 | 3.48 | 1.7 |

Table III is a comparison of some of the conventional resistance bondable coatings available. All of the samples were prepared from 18 AWG copper wire and were coated with a layer of about 1.0–1.1 mils of bondcoat. Helical coils of each wire were then prepared and resistance bonded at appropriate baking temperature. As is evident from Table III, the present nylon bondcoat offers superior bonding at all elevated temperatures unachievable by these resistance bondcoats of the prior art.

The bondcoat disclosed and claimed in this invention offers a unique heat bondable coating for use in bonding magnet wire windings together without the use of solvents which are undesirable for the reasons mentioned above. The bondcoat retains its bond strength to all conditions related to Class 180 standards while exhibiting the required physical properties of flexibility and lack of crazing during use.

It should be understood that the invention is not limited to the particular embodiments shown and described herein, but that various changes and modifications may be made without departing from the spirit and scope of this novel concept as defined by the following claims.

I claim:

1. A magnet wire bondcoat consisting essentially of the polyamide reaction product of:
   (1) a polyamide having recurring units of the formula

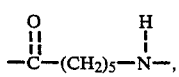

(2) R—CHO wherein R is an aliphatic moiety, and
   (3) an aromatic alcohol selected from the group consisting of phenols, cresols or alkylated phenols.

2. The bondcoat of claim 1 wherein R comprises less than 7 carbon atoms.

3. The bondcoat of claim 1 wherein R—CHO is paraformaldehyde.

4. The bondcoat of claim 1, wherein the aromatic alcohol is phenol.

5. A magnet wire bondcoat consisting essentially of the polyamide reaction product of:
   (1) a polyamide having recurring units of the formula

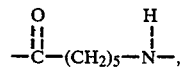

(2) R—CHO wherein R is an aliphatic moiety having less than 7 carbon atoms, and
   (3) an aromatic alcohol selected from the group consisting of phenols, cresols or alkylated phenols.

6. The bondcoat of claim 5 wherein R—CHO is paraformaldehyde.

7. The bondcoat of claim 5 wherein the aromatic alcohol is a phenol.

8. The bondcoat of claim 5 wherein the aromatic alcohol is a cresol.

9. The bondcoat of claim 5 wherein the aromatic alcohol is an alkylated phenol.

10. A magnet wire bondcoat consisting essentially of the polyamide reaction product of:
    (1) a polyamide having recurring units of the formula

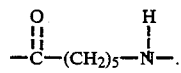

(2) R—CHO wherein R is an aliphatic moiety, and
    (3) phenol.

11. The bondcoat of claim 10 wherein the R component of the aliphatic compound comprises less than 7 carbon atoms.

* * * * *